US010293666B2

United States Patent
Choi et al.

(10) Patent No.: US 10,293,666 B2
(45) Date of Patent: May 21, 2019

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventors: Junho Choi, Seoul (KR); Eunjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/458,825

(22) Filed: Mar. 14, 2017

(65) Prior Publication Data

US 2018/0079284 A1  Mar. 22, 2018

(30) Foreign Application Priority Data

Sep. 21, 2016 (KR) .................. 10-2016-0120896

(51) Int. Cl.
*B60J 1/17* (2006.01)
*B60J 3/04* (2006.01)
(Continued)

(52) U.S. Cl.
CPC .............. *B60J 3/04* (2013.01); *B60J 1/17* (2013.01); *B60K 35/00* (2013.01); *E05F 15/75* (2015.01);
(Continued)

(58) Field of Classification Search
CPC .... B60J 1/17; B60J 3/04; B60K 35/00; B60K 2350/1056; B60K 2350/352; E05F 15/75;
(Continued)

(56) References Cited

U.S. PATENT DOCUMENTS 5,545,897 A * 8/1996 Jack ................... G01N 33/0011
250/339.13
5,583,539 A * 12/1996 Hiketa ................ G06F 3/021
345/173
(Continued)

FOREIGN PATENT DOCUMENTS

JP  2007326526  12/2007
JP  2009143296  7/2009
(Continued)

OTHER PUBLICATIONS

PCT International Application No. PCT/KR2017/003580, Notification of Transmittal of the International Search Report and the Written Opinion of the International Searching Authority, or Declaration dated Jul. 11, 2017, 14 pages.

*Primary Examiner* — Loha Ben
(74) *Attorney, Agent, or Firm* — Lee Hong Degerman Kang & Waimey

(57) ABSTRACT

The present invention relates to a vehicle control device provided in a vehicle and a control method of the vehicle. A vehicle control device according to an embodiment of the present disclosure may include a windshield provided in a vehicle, and formed to allow changing transparency, a sensing unit configured to sense information associated with the vehicle, and a processor configured to adjust the transparency of the windshield based on that information sensed through the sensing unit satisfies a preset condition.

20 Claims, 25 Drawing Sheets

(51) Int. Cl.
  *E06B 9/24* (2006.01)
  *G02F 1/01* (2006.01)
  *B60K 35/00* (2006.01)
  *E05F 15/75* (2015.01)
  *G02B 27/01* (2006.01)

(52) U.S. Cl.
  CPC ....... *G02B 27/0101* (2013.01); *G02F 1/0121* (2013.01); *B60K 2350/1056* (2013.01); *B60K 2350/352* (2013.01); *E06B 2009/2464* (2013.01); *G02B 2027/014* (2013.01); *G02F 2201/58* (2013.01); *G02F 2203/01* (2013.01); *G02F 2203/18* (2013.01); *G02F 2203/48* (2013.01)

(58) Field of Classification Search
  CPC ............... G02B 26/00; G02B 27/0101; G02B 2027/014; E06B 9/24; E06B 2009/2417; E06B 2009/2464; G02F 1/01; G02F 1/0121; G02F 2201/58; G02F 2203/01; G02F 2203/18; G02F 2203/48; G06K 9/00791; G06K 9/00845; G06F 3/01; G06F 3/041; G06F 3/0416
  USPC ................ 359/237, 238, 265, 275; 345/105, 345/173–175, 520
  See application file for complete search history.

(56) References Cited

U.S. PATENT DOCUMENTS

| | | | | |
|---|---|---|---|---|
| 9,815,467 | B2 * | 11/2017 | Park | B60W 30/18109 |
| 9,952,051 | B2 * | 4/2018 | Kim | B60R 1/00 |
| 10,086,762 | B2 * | 10/2018 | Uhm | B60K 28/02 |
| 10,144,289 | B2 * | 12/2018 | Lee | B60K 37/06 |
| 2009/0174533 | A1 * | 7/2009 | Bowden | B60K 37/02 340/425.5 |
| 2010/0065721 | A1 | 3/2010 | Broude et al. | |
| 2016/0247403 | A1 | 8/2016 | Krauss et al. | |
| 2016/0332568 | A1 * | 11/2016 | Kim | B60Q 1/50 |
| 2017/0187963 | A1 * | 6/2017 | Lee | G06F 3/013 |
| 2017/0228126 | A1 * | 8/2017 | Kim | G02B 6/0055 |
| 2017/0283065 | A1 * | 10/2017 | Papke | G09F 19/22 |
| 2017/0349098 | A1 * | 12/2017 | Uhm | B60R 1/00 |
| 2018/0106098 | A1 * | 4/2018 | Unveren | E06B 9/24 |

FOREIGN PATENT DOCUMENTS

| | | |
|---|---|---|
| JP | 2010006302 | 1/2010 |
| KR | 1020130071239 | 6/2013 |

* cited by examiner

[ Log-Out ]

[ Log-In ]

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2016-0120896, filed on Sep. 21, 2016, the contents of which are incorporated by reference herein in their entirety.

BACKGROUND OF THE INVENTION

1. Field of the Invention

The present disclosure relates to a vehicle control device provided in a vehicle and a control method of the vehicle.

2. Background of the Invention

A vehicle is an apparatus capable of moving a user in the user-desired direction, and a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

As part of this, the necessity of technology development on User Interfaces/User Experiences (UIs/UXs) using windshields provided in a vehicle has increased.

SUMMARY OF THE INVENTION

An object of the present disclosure is to provide a vehicle control device and a control method of the vehicle capable of controlling a windshield provided in a vehicle in an optimized method.

Another object of the present disclosure is to provide a vehicle control device and a control method of the vehicle capable of controlling the transparency of a windshield in an optimized method according to circumstances.

Still another object of the present disclosure is provide a vehicle control device and a control method of the vehicle capable of displaying various information on a windshield.

The tasks to be solved in the present invention may not be limited to the aforementioned, and other problems to be solved by the present invention will be obviously understood by a person skilled in the art based on the following description.

In order to accomplish the foregoing tasks, a vehicle control device according to an embodiment of the present disclosure may include a windshield provided in a vehicle, and formed to allow changing transparency, a sensing unit configured to sense information associated with the vehicle, and a processor configured to adjust the transparency of the windshield based on that information sensed through the sensing unit satisfies a preset condition.

According to an embodiment, the processor may change the transparency of the windshield when a driving speed of the vehicle varies by a predetermined speed.

According to an embodiment, the processor may set the transparency to a first transparency when the speed of the vehicle is a first speed, and change the transparency to a second transparency different from the first transparency when the speed of the vehicle is changed to a second speed different from the first speed.

According to an embodiment, the processor may sense a user approaching the vehicle through the sensing unit, and change the transparency of the windshield when the sensed user enters a reference region based on the vehicle.

According to an embodiment, the transparency of the windshield may be changed when the sensed user is an authenticated user.

According to an embodiment, when the user enters the reference region in a state that the transparency of the windshield is a first transparency, the processor may change the transparency of the windshield to a second transparency different from the first transparency.

According to an embodiment, there may be a plurality of windshields, and the processor may change the transparency of at least one of the plurality of windshields based on a direction in which the sensed user approaches the vehicle.

According to an embodiment, the processor may change the transparency of at least one windshield disposed in a direction in which the user approaches among the plurality of windshields.

According to an embodiment, the processor may change the transparency of the windshield when an unauthenticated user enters the reference region in a state that the authenticated user exists within the vehicle.

According to an embodiment, when an authenticated user enters the reference region in a state that the transparency of the windshield is a first transparency, the processor may change the windshield with the first transparency to a second transparency that is more non-transparent than the first transparency.

According to an embodiment, the processor may adjust the transparency of the windshield based on the surrounding brightness of the vehicle sensed through the sensing unit.

According to an embodiment, when the vehicle is being stopped, the processor may control the transparency of at least one of a plurality of windshields to be different from the transparency of the remaining windshields based on whether or not a preset object exists within a predetermined distance from the vehicle.

According to an embodiment, the windshield may be formed to allow changing the transparency of a partial region of the entire region.

According to an embodiment, when a touch is applied to the windshield, the processor may change transparency on a predetermined-sized region around a position to which the touch is applied.

According to an embodiment, the processor may change a first transparency to a second transparency when a tap gesture is applied to the windshield, and raise or lower the windshield when a new tap gesture is applied to the windshield with the second transparency.

According to an embodiment, the processor may adjust the transparency of the windshield to be more transparent as a distance between a user and the vehicle decreases.

According to an embodiment, when the sensed information associated with the vehicle satisfies a preset condition, the processor may control the windshield to allow at least one of a plurality of windshields to emit light.

According to an embodiment, the windshield may be allowed to display screen information, and the processor may display different screen information on the windshield based on the sensed information of the vehicle.

A vehicle according to an embodiment of the present disclosure may include a vehicle control device as disclosed herein.

A control method of a vehicle including a vehicle control device according to an embodiment of the present disclosure may include sensing information associated with a vehicle through a sensing unit, and adjusting the transparency of a windshield provided in the vehicle based on that the sensed information satisfies a preset condition.

In addition, the specific details of embodiments are included in the detailed description and drawings.

According to an embodiment of the present disclosure, there are one or more following effects.

First, the present disclosure may have an effect capable of providing a new vehicle control method capable of varying the transparency of a windshield according to a speed of the vehicle.

Second, the present disclosure may provide a vehicle control device and a vehicle capable of varying the transparency of a windshield according to whether or not a user approaches the surrounding of the vehicle and an approaching user is an authenticated user, thereby having an effect capable of providing convenience to allow the authenticated user to more conveniently see an inside of the vehicle from an outside as well as enhancing security to disallow an unauthenticated user to see an inside thereof.

Third, the present disclosure may irradiate light or display screen information in addition to the transparency of the windshield based on information associated with the vehicle, thereby having an effect capable of effectively notifying a notice or notification information to nearby vehicles.

The effects of the present invention may not be limited to those effects, and other effects which have not been mentioned can be obviously understood by those skilled in the art from the appending claims.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
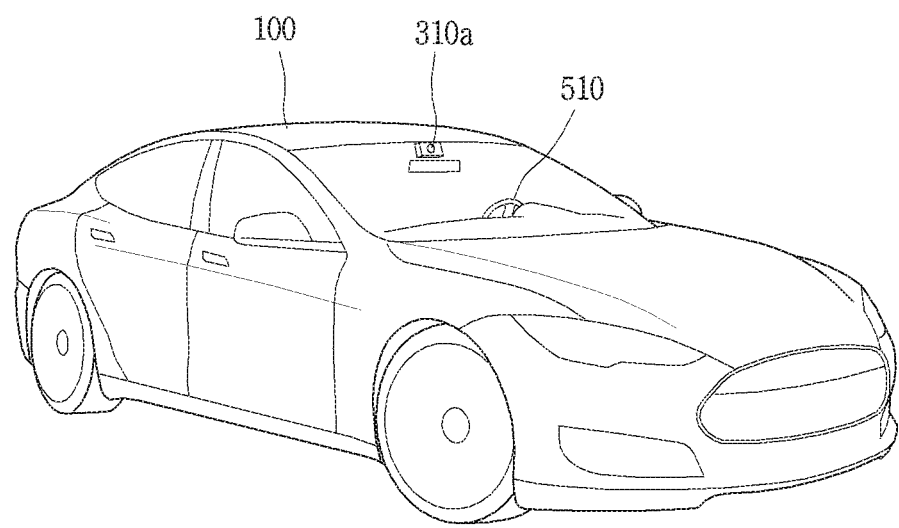
FIG. 1 is a view illustrating an appearance of a vehicle according to an embodiment of the present disclosure.
Figure 1:
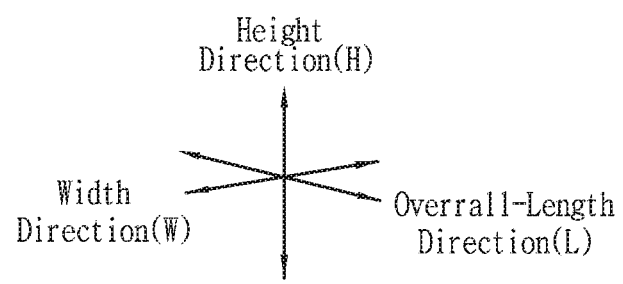

FIG. 1 is a view illustrating appearance of a vehicle in accordance with an embodiment of the present invention.

Figure 2:
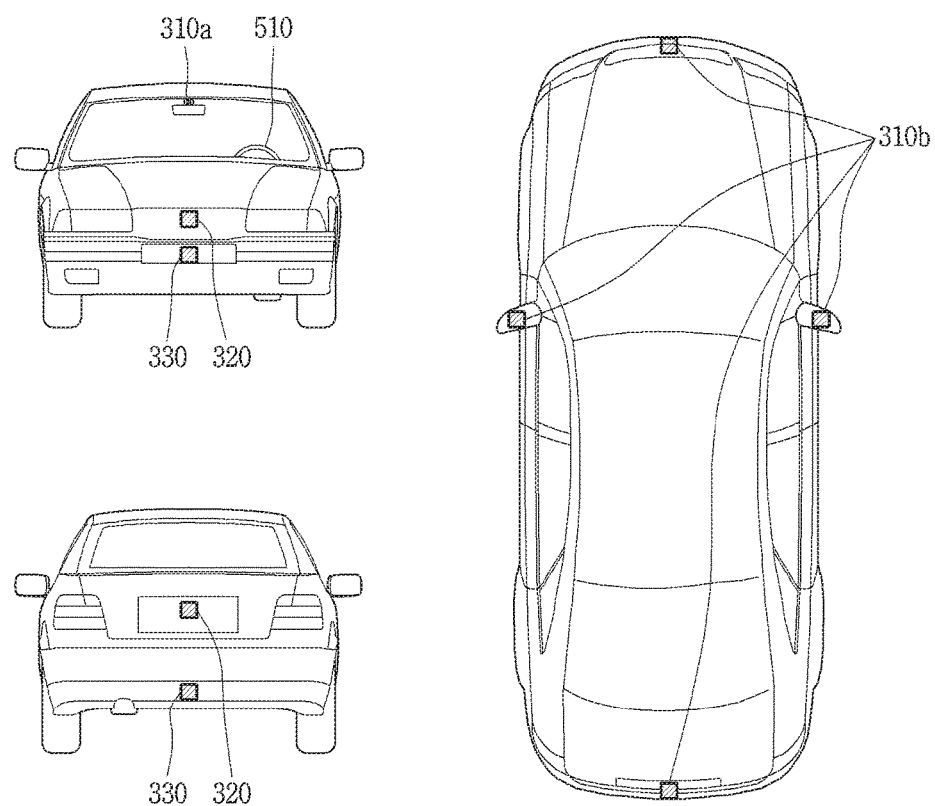
FIG. 2 is a view in which a vehicle according to an embodiment of the present disclosure is seen at various angles.

FIG. 2 is a view illustrating appearance of a vehicle at various angles in accordance with an embodiment of the present invention.

Figure 3:
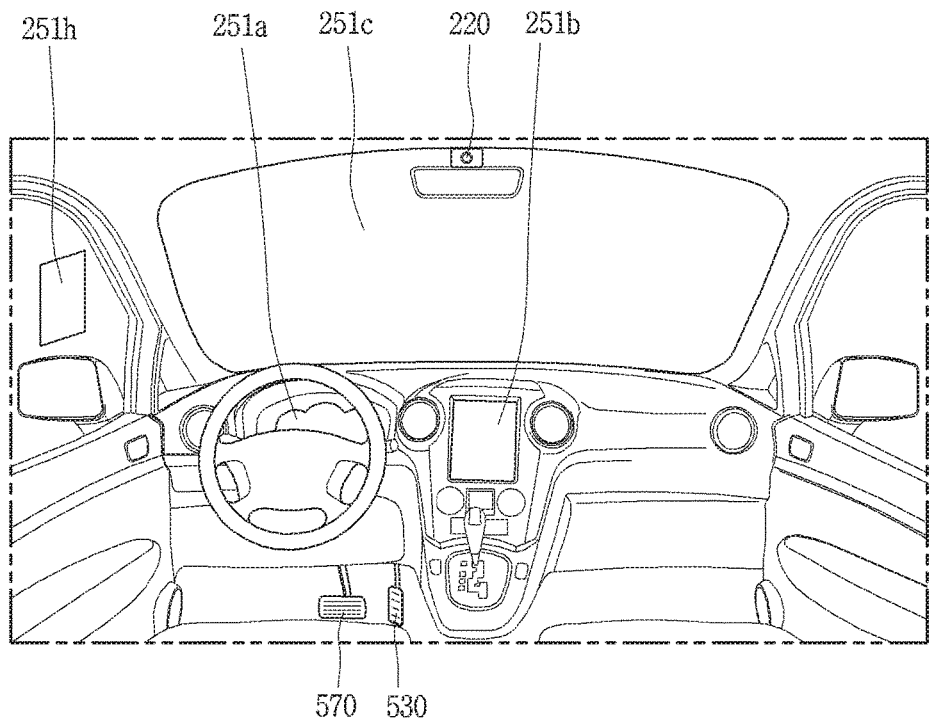
FIGS. 3 and 4 are views illustrating an inside of a vehicle according to an embodiment of the present disclosure.
Figure 4:
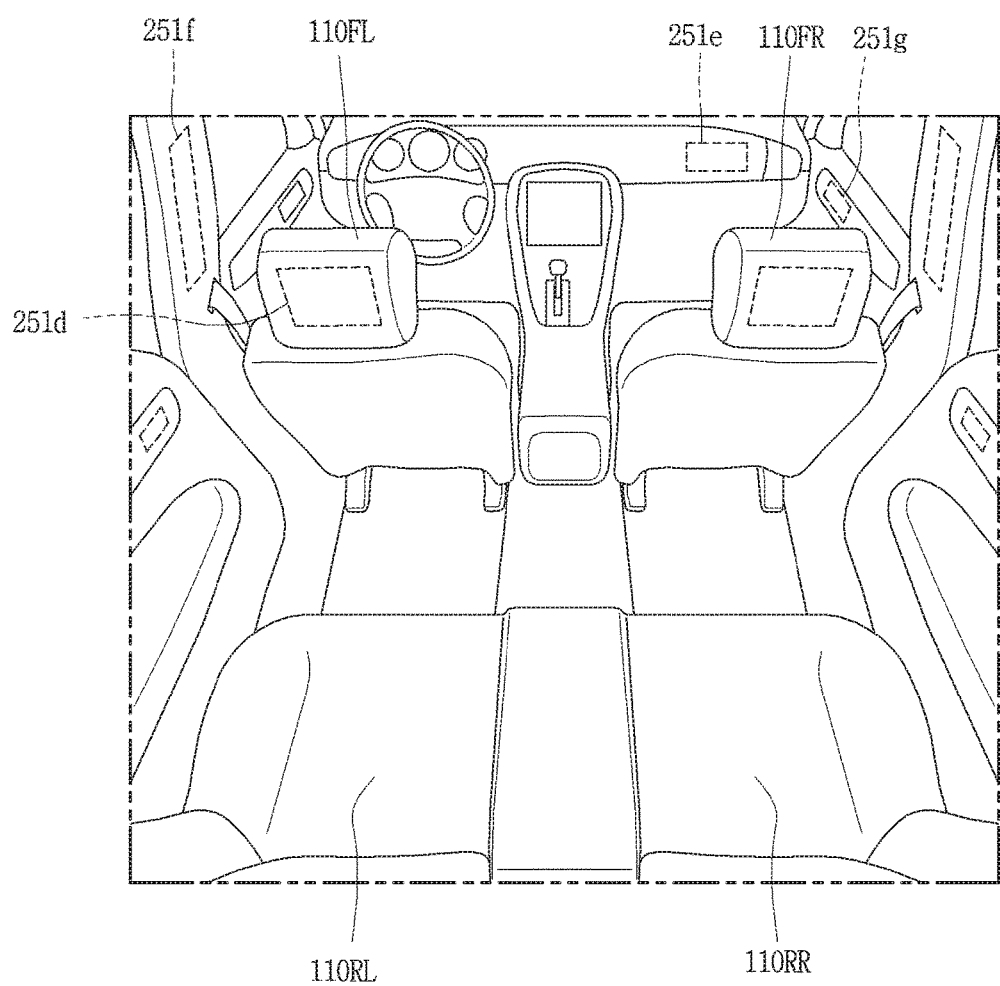

FIGS. 3 and 4 are views illustrating an inside of a vehicle in accordance with an embodiment of the present invention.

Figure 5:
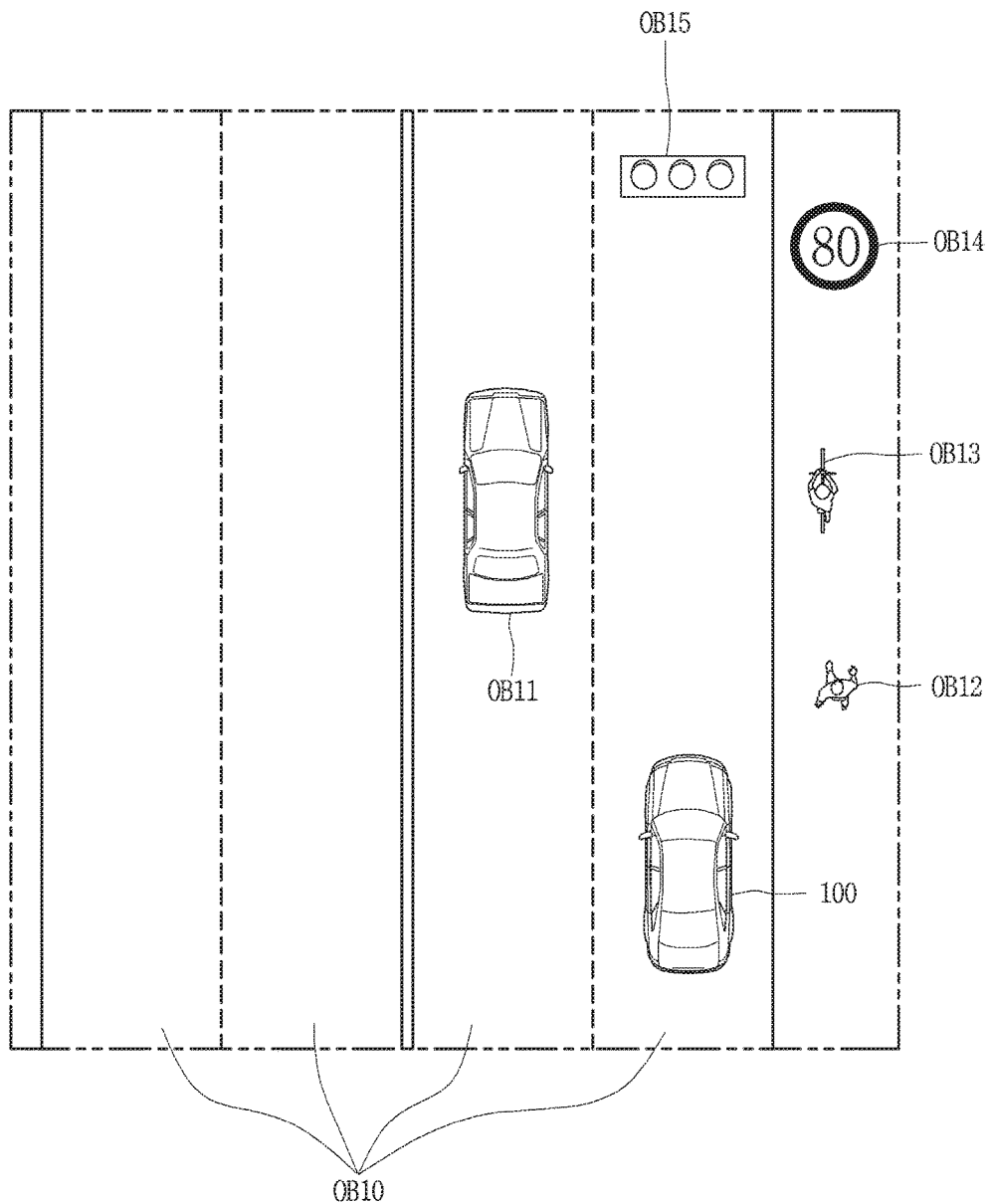
FIGS. 5 and 6 are views referred for explaining objects according to an embodiment of the present disclosure.
Figure 6:
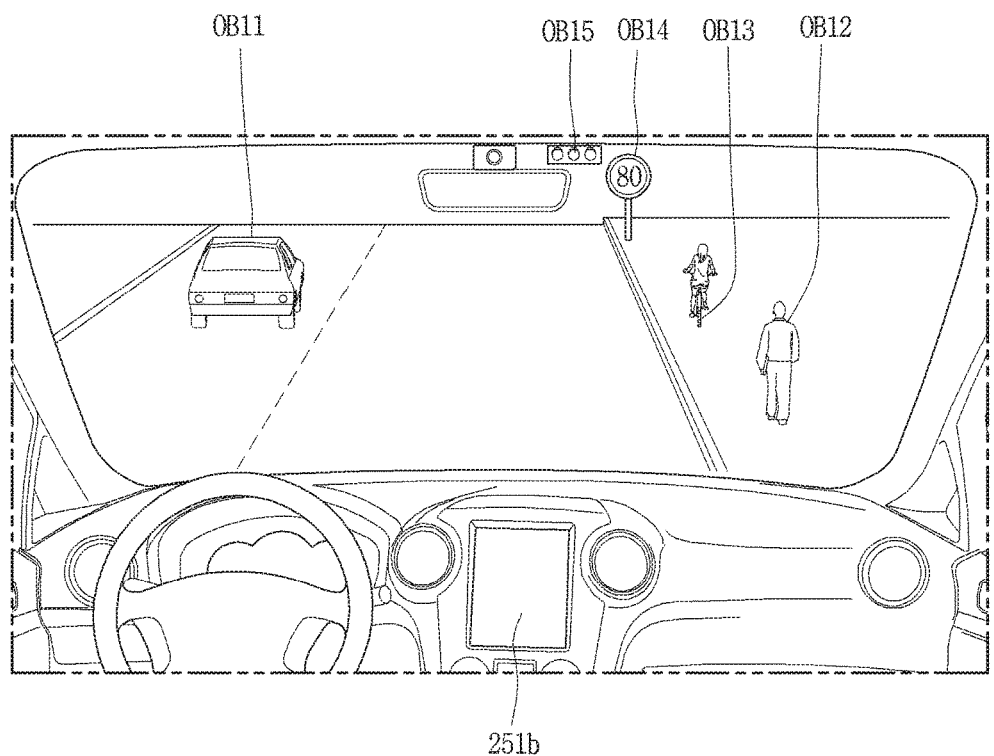

FIGS. 5 and 6 are reference views illustrating objects in accordance with an embodiment of the present invention.

Figure 7:
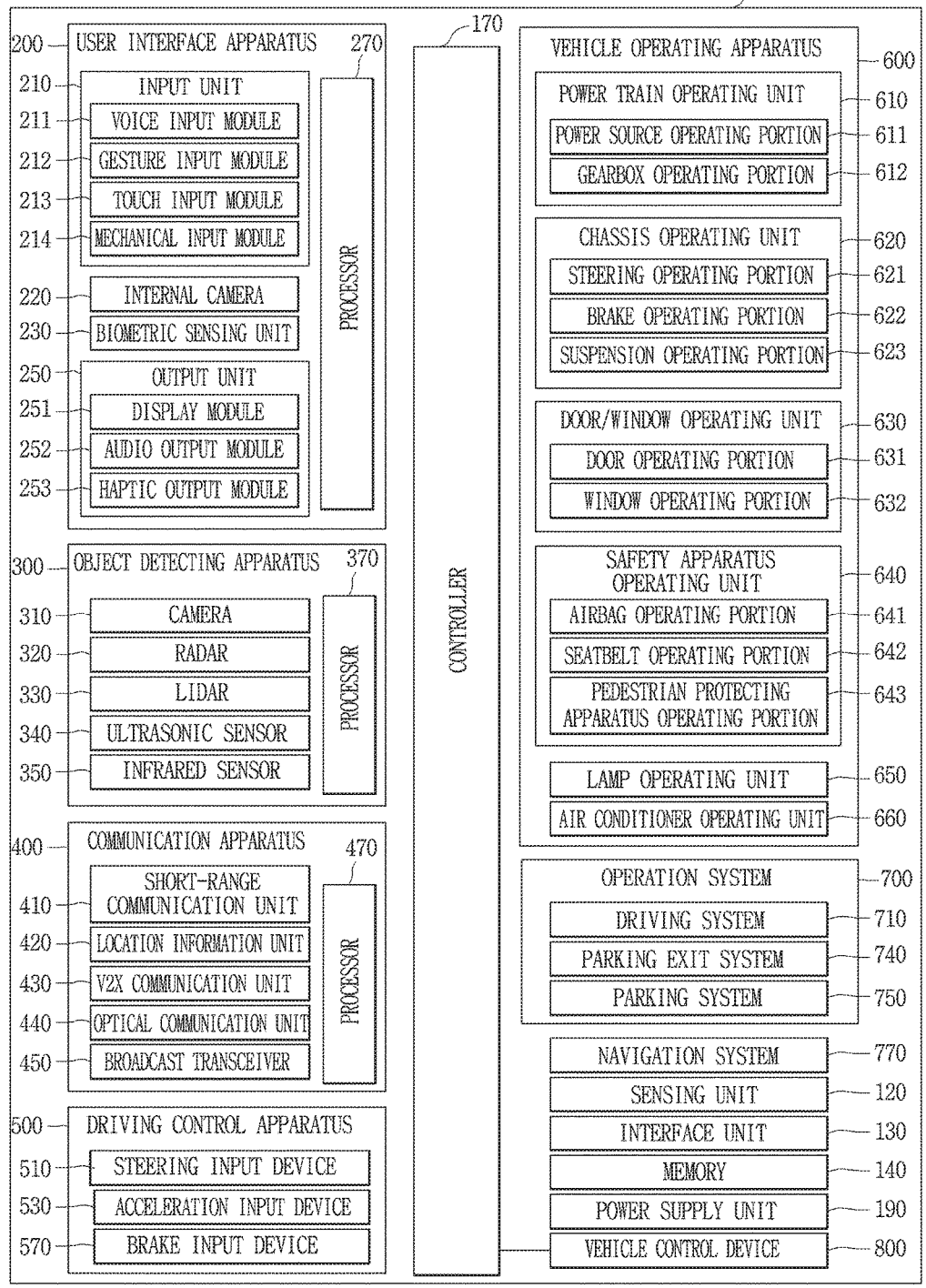
FIG. 7 is a block diagram referred for explaining a vehicle according to an embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 251*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100.

For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one embodiment of the present invention, with reference to the accompanying drawings.

Figure 8:
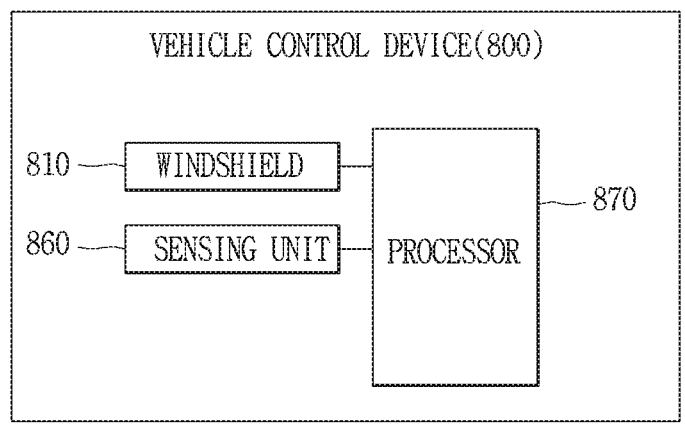
FIG. 8 is a conceptual view for explaining a vehicle control device according to an embodiment of the present disclosure.

FIG. 8 is a conceptual view for explaining a vehicle control device according to an embodiment of the present disclosure.

The vehicle control device 800 associated with the present disclosure may include a windshield 810, a sensing unit 860, a processor 870, and the like.

The windshield 810 may be the foregoing window apparatus. The windshield 810 may be provided in a vehicle, and there may be a plurality of windshields.

The windshield 810 described herein may include a window apparatus provided on a vehicle door, as well as a front glass disposed at a front side, a rear glass disposed at a rear side, a sunroof glass, and the like.

The windshield associated with the present disclosure may be formed to allow changing transparency. Here, the transparency may denote a light transmittance.

Increasing (raising) the transparency of the windshield may denote increasing the light transmittance. In other words, increasing the light transmittance may denote gradually increasing an amount of light passing through the windshield. As the transmittance of the windshield increases, the windshield will be more transparent.

On the contrary, decreasing (lowering) the transparency of the windshield may denote decreasing the light transmittance. In other words, decreasing the light transmittance may denote gradually decreasing an amount of light passing through the windshield. As the transmittance of the windshield decreases, the windshield will be more non-transparent.

The windshield associated with the present disclosure may include a film capable of varying a transparency to adjust the transparency. The film may include a polymer dispersed liquid crystal (PDLC) film, a suspended particle devices (SPD) film, an electrochromic (EC) film, and the like.

Figure 10:
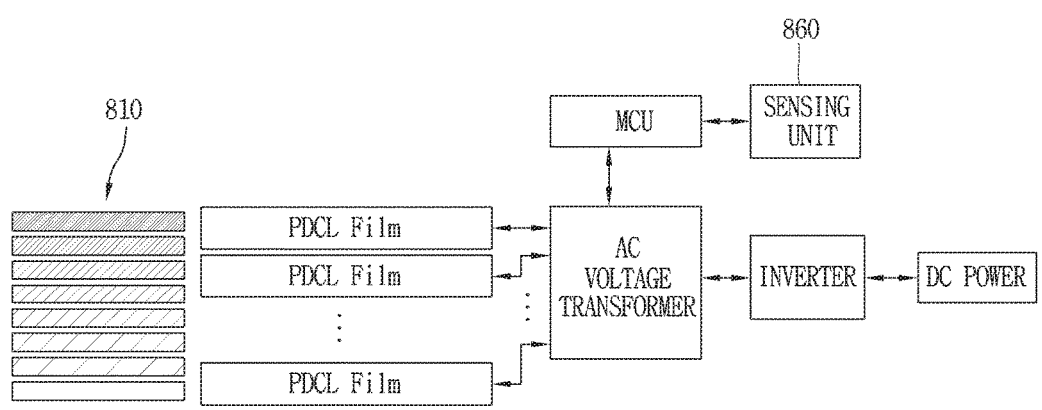
FIG. 10 is a conceptual view for explaining a method of adjusting the transparency of a windshield according to an embodiment of the present disclosure.
Figure 11:
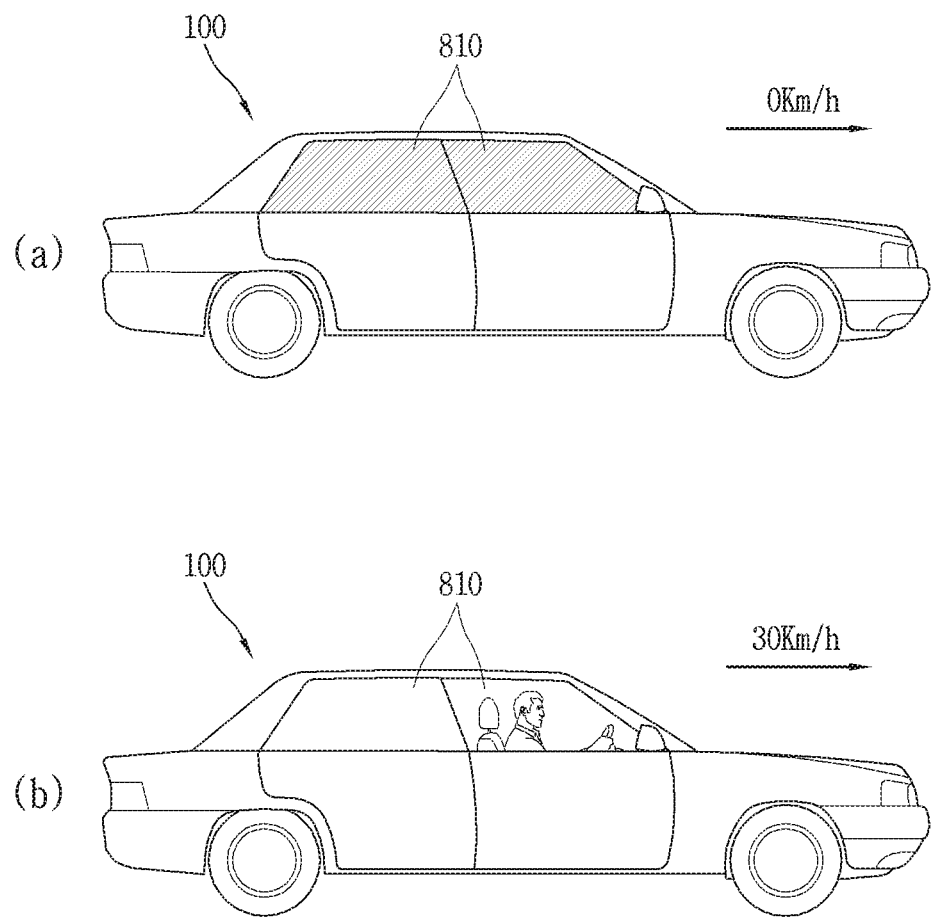
FIGS. 11, 12A, 12B, 12C, 13, 14, 15, 16, 17 and 18 are conceptual views for explaining a control method illustrated in FIG. 9.

FIG. 10 is a conceptual view for explaining a method of adjusting the transparency of a windshield according to an embodiment of the present disclosure.

Referring to FIG. 10, a windshield according to an embodiment of the present disclosure may include a film capable of varying the transparency, a DC power, an inverter, a AC voltage transformer, and a machine control unit (MCU), and the like. Each component is based on a well-known technology, and thus the detailed description thereof will be omitted.

Here, MCU may be the controller 170 or processor 870 or an additional control unit provided in the present vehicle.

For an embodiment, MCU may control the film to change (adjust) the transparency of the windshield 810 based on information (for example, information associated with the vehicle) sensed through the sensing unit 860.

On the other hand, various technologies for controlling the transparency may be applicable to the windshield associated with the present disclosure. For example, the windshield may be implemented with a transparent display or may be a glass (or display) provided with a liquid crystal (LC) layer.

The technology for varying the transparency is a general technology, and thus the detailed description thereof will be omitted.

The windshield 810 disclosed therein may not be necessarily limited to the foregoing description. The windshield 810 disclosed herein may include all technologies/devices/ means capable of varying the transmittance, namely, transparency of light. Furthermore, a vehicle including a windshield capable of the transparency and a control method associated with the vehicle may be included in the scope of the present disclosure.

On the other hand, the sensing unit 860 included in the vehicle control device 800 associated with the present disclosure may be the object detecting apparatus 300 illustrated in FIG. 7 or the sensing unit 120 provided in the vehicle 100.

Furthermore, the sensing unit 860 may be the object detecting apparatus 300 provided in the vehicle or the sensing unit 120 provided in the vehicle 100 may be an independent additional sensing unit. Even if the sensing unit 860 is an independent sensing unit, the sensing unit 860 may include the characteristics of the sensing unit cover 120 or object detecting apparatus 300 illustrated in FIG. 7.

Furthermore, the sensing unit 860 may be implemented in combination with at least two of the camera 310, the radar 320, the lidar 330, the ultrasonic sensor 340, the infrared sensor, and the sensing unit 120.

The sensing unit 860 may sense information associated with the vehicle 100 of the present disclosure.

The information associated with the vehicle may be at least one of vehicle information (or driving status of the vehicle) and surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user gets in the vehicle, and information associated with the user (for example, whether or not the user is an authenticated user), and the like.

The surrounding information of the vehicle may be a state of road surface on which the vehicle is travelling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, ambient brightness, a temperature, a position of the sun, nearby subject (a person, another vehicle, a sign, etc.) information, a type of driving road surface, a landmark, line information, driving lane information), and information required for an autonomous driving/autonomous parking/automatic parking/manual parking mode.

Furthermore, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Hereinafter, for the sake of convenience of explanation, a configuration in which the sensing unit 860 is additionally provided in the vehicle control device 800 will be described as an example. Allowing the processor 870 to acquire any information through the sensing unit 860 may be understood as allowing the processor 870 to acquire any information using at least one of the object detecting apparatus 300 and the sensing unit 120 provided in the vehicle 100.

The vehicle control device 800 of the present disclosure may include the processor 870 capable of controlling the windshield 810 and sensing unit 860.

The processor 870 may be the controller 170 illustrated in FIG. 7.

The processor 870 may control the constituent elements illustrated in FIG. 7 and the constituent elements illustrated in FIG. 8.

The processor 870 included in the vehicle control device 800 associated with the present disclosure may adjust the transparency of the windshield 810 based on that information sensed through the sensing unit 860 satisfies a preset condition.

Hereinafter, various embodiments of allowing a vehicle control device associated with the present disclosure to control a windshield provided in a vehicle will be described in more detail with reference to the accompanying drawings.

Figure 9:
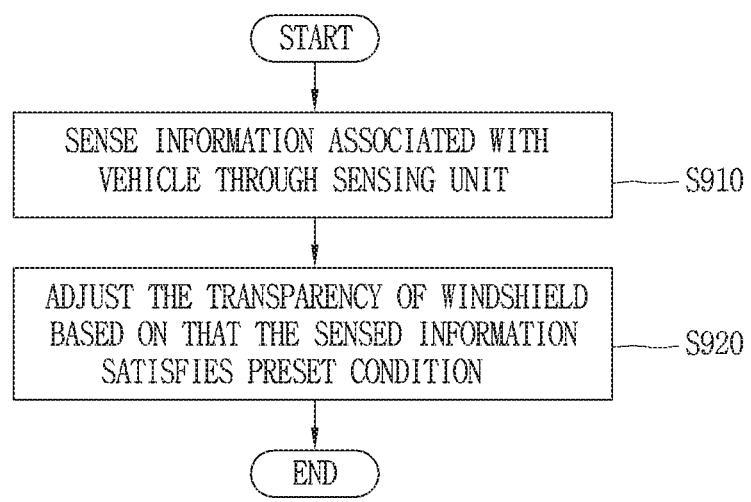
FIG. 9 is a flow chart for explaining a representative control method according to the present invention.

FIG. 9 is a flow chart for explaining a representative control method according to the present invention, and FIGS. 11, 12A, 12B, 12C, 13, 14, 15, 16, 17 and 18 are conceptual views for explaining a control method illustrated in FIG. 9.

Referring to FIG. 9, first of all, according to the present disclosure, the process of sensing information associated with a vehicle through the sensing unit is carried out (S910).

Specifically, periodically or when a specific condition occurs, the processor 170 may always activate the sensing unit 860, and sense information associated with the vehicle through the sensing unit 860.

Here, the information associated with the vehicle may include vehicle information (or driving status of the vehicle), surrounding information of the vehicle, and the like.

Furthermore, the information associated with the vehicle may include various conditions/situations disclosed herein.

Then, according to the present disclosure, the process of adjusting (changing) the transparency of the windshield based on that the sensed information satisfies a preset condition is carried out (S920).

Specifically, when information associated with the vehicle is sensed through the sensing unit 860, the processor 870 may determine (decide, detect, extract, sense) whether or not the information associated with the vehicle satisfies a preset condition.

Here, the preset condition may include various conditions as a preset condition to vary the transparency of the windshield.

For an example, the various conditions may include whether or not a driving speed of the vehicle is above a predetermined speed, whether or not a user approaches a reference region based on the vehicle, whether or not the approaching user is an authenticated user, whether or not another user approaches in a state that an authenticated user gets in the vehicle, a surrounding brightness of the vehicle, whether or not a preset object exists within a predetermined distance from the vehicle, whether or not a preset type of user input (or gesture) is received, and the like.

The transparency of the windshield in the present specification may vary within a reference range (for example, a range permitted by law regulations), for an example. For an example, the transparency may vary within a range of light transmittance of 70-100% in case of a front windshield (front glass), and the transparency may vary within a range of light transmittance of 40-100% in case of a left and a right windshield.

Hereinafter, a method of adjusting the transparency of the windshield when a preset condition is satisfied will be described in more detail with reference to the accompanying drawings.

The processor 870 of the vehicle control device 800 associated with the present disclosure may change the transparency of the windshield 810 when a driving speed of the vehicle 100 varies by a predetermined speed.

For example, as illustrated in FIG. 11A, the processor 870 may set the transparency of the windshield 810 to a first transparency when the speed of the vehicle 100 is a first speed (for example, 0 km/h).

As illustrated in FIG. 11B, when the speed of the vehicle 100 is changed to a second speed (for example, 30 km/h) different from the first speed as illustrated in FIG. 11B, the processor 870 may change the transparency of the windshield 810 to a second transparency different from the first transparency.

For another example, when the speed of the vehicle is less than a predetermined speed, the processor 870 of the present disclosure may control the windshield to allow the transparency of the windshield 810 to be a first transparency (for example. light transmittance of 40%). Furthermore, when the speed of the vehicle is above a predetermined speed, the processor 870 may change the transparency of the windshield 810 to be a second transparency (for example. light transmittance of 100%) different from the first transparency.

The processor 870 associated with the present disclosure may change the transparency of the windshield 810 when a variation amount of the vehicle driving speed is above a predetermined amount, and determine the transparency of the windshield 810 according to whether or not the driving speed of the vehicle is greater or less than a predetermined speed.

Furthermore, the processor 870 may vary the transparency of the windshield 810 in proportion to the driving speed of the vehicle or vary the transparency of the windshield 810 in inverse proportion to the driving speed of the vehicle.

Furthermore, the processor 870 may maintain the transparency of the windshield to be a first transparency below a first speed, maintain the transparency of the windshield to be a second transparency different from the first transparency, and vary the transparency of the windshield in proportion or inverse proportion to the speed of the vehicle between the first speed and the second speed.

When the transparency of the windshield varies based on the satisfaction of a preset condition, it may be possible to have various design changes to change it to be more transparent or non-transparent, and may be determined according to the user's setting or determined by the control of the processor (or controller).

The present disclosure may not be necessarily limited to embodiments disclosed herein, and it should be noted that the present disclosure may be also applicable in an inverse manner to the description disclosed herein. For example, when it is described in the present disclosure that the transparency of the windshield is changed to be more transparent as the speed of the vehicle increases, it should be understood that a case where the transparency of the windshield is changed to be more non-transparent as the speed of the vehicle increases is included in the scope of the present disclosure.

As described above, the present disclosure may provide a new windshield control method capable of varying the transparency of the windshield when the speed of the vehicle is sensed through the sensing unit, and the speed of the vehicle varies by a predetermined speed (or the speed of the vehicle is above a predetermined speed).

Figure 12A:
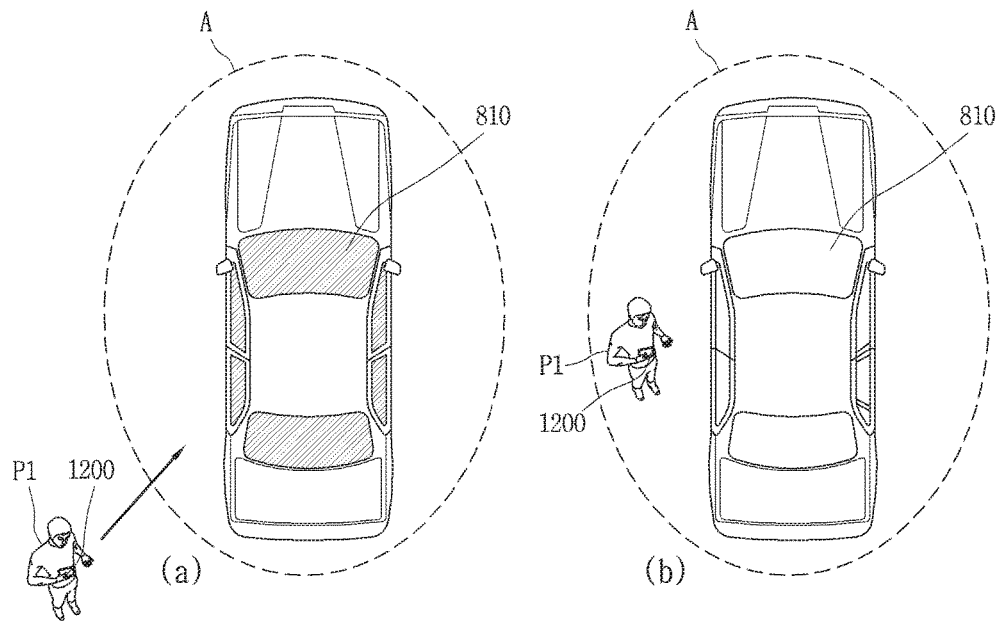
Figure 12A:
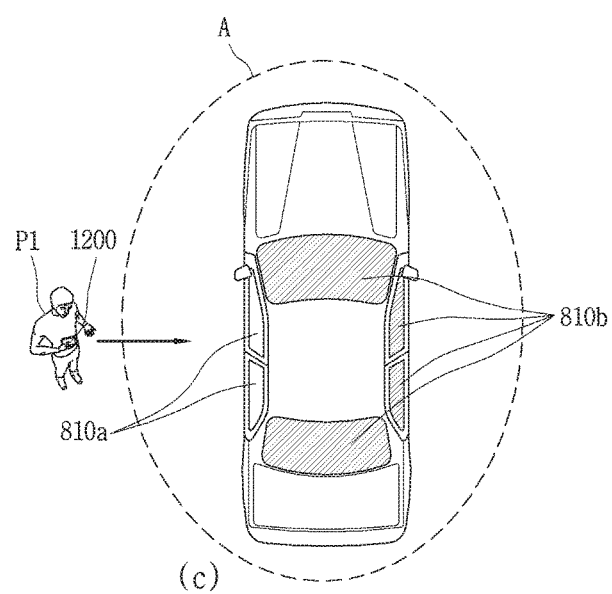

Referring to FIG. 12A, the processor 870 associated with the present disclosure may sense a user approaching the vehicle 100 through the sensing unit 860. Then, when the sensed user enters a reference region based on the vehicle 100, the processor 870 may change the transparency of the windshield.

Here, the reference region (A) may denote a predetermined region (space) based on the vehicle.

The reference region (A) may be set in various ways. For an example, the reference region may be a region capable of sensing an object through the sensing unit 860 or a space existing within a predetermined distance with respect to the vehicle 100 or a preset region.

When it is sensed through the sensing unit 860 that a user enters the reference region (A), the processor 870 may change the transparency of the windshield 810. For example, when the user enters within the reference region (A) in a state that that the transparency of the windshield 810 is a first transparency (for example, light transmittance of 40%), the processor 870 may change the transparency to a second transparency (for example, light transmittance of 100%) different from the first transparency.

On the other hand, the transparency of the windshield may be changed when the sensed user is an authenticated user.

Here, the processor 870 of the vehicle 100 may determine whether or not the sensed user is an authenticated user in various methods.

For an example, when it is connected to the user's mobile terminal 1200 to enable wireless communication through the communication unit of the vehicle or the mobile terminal 1200 connected to enable wireless communication is a terminal that has successfully completed an authentication process in advance (subsequent to the entry), the processor 870 may determine the user who possesses the mobile terminal 1200 as an authenticated user.

For another example, when the user enters the reference region (A), the processor 870 may transmit a signal for checking whether or not there is an authenticated terminal, and when there is a response to the signal from the user's mobile terminal 1200, the processor 870 may determine the user as an authenticated user. Here, the response may be a response signal transmitted from a previously authenticated mobile terminal when the terminal receives the signal.

For still another example, the processor 870 may determine whether or not a user who has entered the reference region (A) is an authenticated user using a camera or determine whether or not a user who has entered the reference region (A) is an authenticated user using a fingerprint recognition sensor, an iris recognition sensor or the like.

When a user who has entered the reference region (A) is an authenticated user, for an example, the processor 870 may change a non-transparent windshield 810 to be transparent. Here, being non-transparent may denote a case where light transmittance is less than a first reference value, and being transparent may denote a case where light transmittance is greater than a second reference value.

The first and the second reference value may be the same value or different values, and when they are different, the first reference value may be larger than the first reference value.

For an example, when an authenticated user (P1) enters the reference region (A) in a state that the transparency of the windshield 810 is a first transparency as illustrated in FIG. 12A(a), the processor 870 may change the transparency of the windshield 810 from the first transparency to a second transparency as illustrated in FIG. 12A(b).

On the other hand, the present disclosure may not be necessarily limited to changing the transparency of the windshield only when a user who has entered the reference region (A) is an authenticated user. The present disclosure may change the transparency of the windshield even when an unauthenticated user enters the reference region (A).

Hereinafter, a case where a user entering the reference region (A) is an authenticated user and a case where the user entering the reference region (A) is an unauthenticated user will be described in a distinguished manner, but the description thereof may be modified and applied in various ways regardless of whether or not the user is authenticated.

On the other hand, the windshield 810 associated with the present disclosure may be a plural number 810*a*, 810*b*.

As illustrated in FIG. 12A(c), when the sensed approaches the vehicle, the processor 870 may determine a direction in which the sensed user approaches the vehicle.

The processor 870 may change the transparency of one 810*a* of the plurality of windshields 810*a*, 810*b* based on a direction in which the sensed user (for example, authenticated user (P1)) approaches the vehicle 100.

For example, the processor 870 may change the transparency of at least one windshield 810*a* of the plurality of windshields 810*a*, 810*b* disposed in a direction in which the user (P1) approaches.

For an example, when a user (for example, an authenticated user) approaches the left side of the vehicle, the windshield 810 disposed at the left of the vehicle may be changed from a first transparency to a second transparency different from the first transparency.

On the other hand, when an unauthenticated user approaches the vehicle 100, (for example, when enters the reference region (A)), the processor 870 may maintain the transparency of the windshield 810 with no change.

Figure 12B:
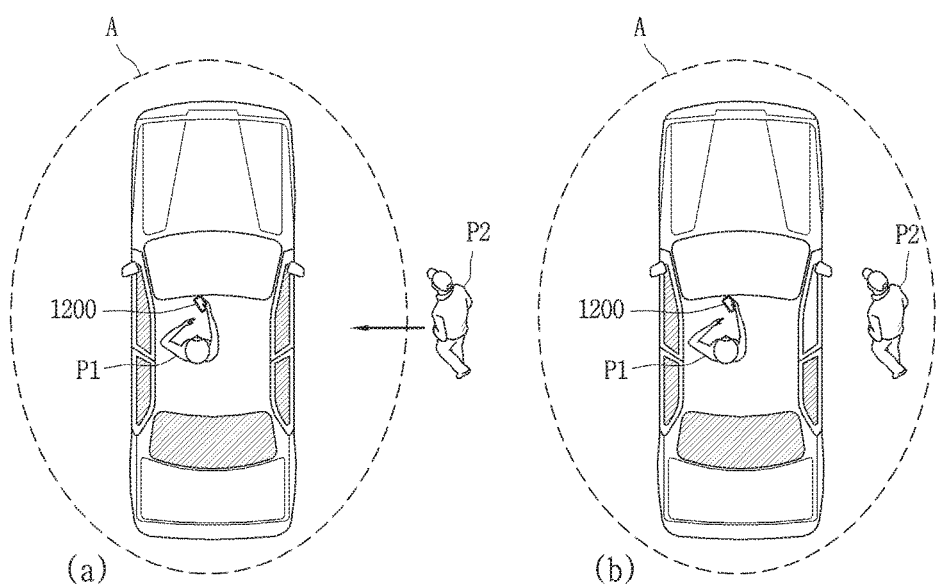

However, as illustrated in FIG. 12B(a), when an unauthenticated user (P2) enters the reference region (A) in a state that an authenticated user (P1) exists within (gets in) the vehicle 100, the processor 870 may change the transparency of the windshield as illustrated in FIG. 12B(b).

For an example, the processor 870 may change the transparency of the windshield located in a direction in which the unauthenticated user approaches from a first transparency to a second transparency different from the first transparency based on a direction in which the unauthenticated user approaches the vehicle 100 among a plurality of windshields.

For an example, when an unauthenticated user approaches the vehicle 100 (when the unauthenticated user enters the reference region (A)) in a state that an authenticated user gets in the vehicle (or an authenticated user exists in the reference region (A)), the processor 870 may control the transparency of the windshield to be transparent.

As described above, even if an authenticated user does not exist within the reference region (A), the processor 870 may change the transparency of the windshield based on an unauthenticated user (P2) entering the reference region (A).

Figure 12C:
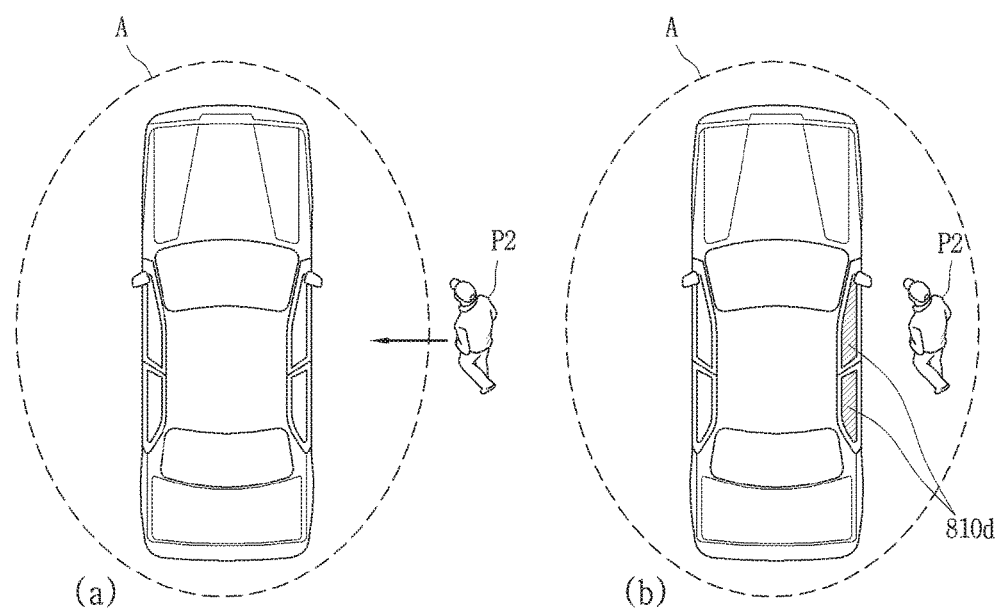
Figure 13:
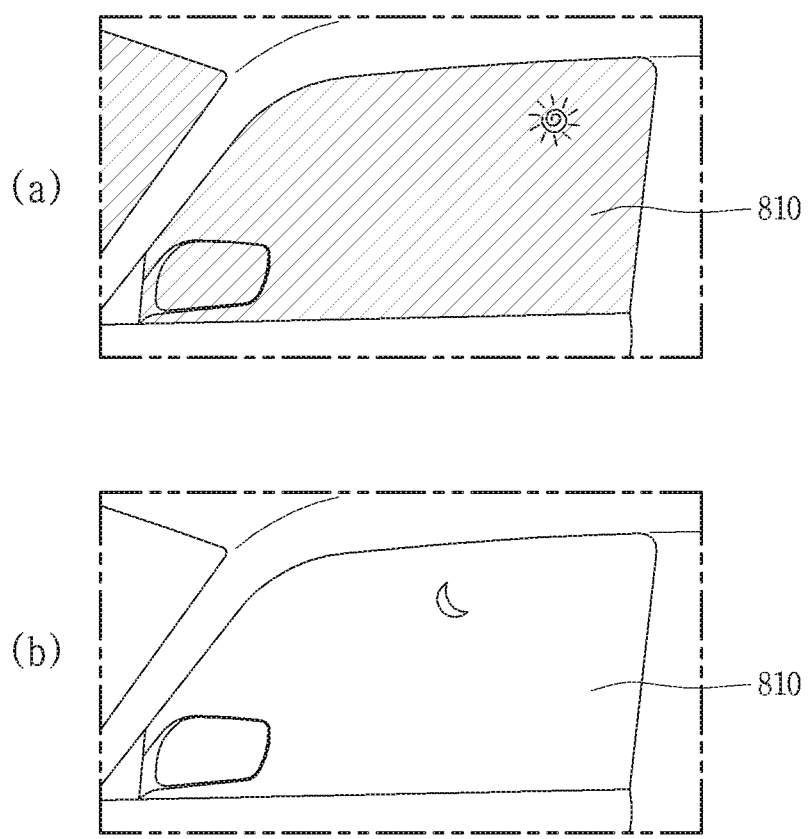

For example, when an unauthenticated user (P2) enters the reference region (A) in a state that the transparency of the windshield 810 is a first transparency (for example, light transmittance of 100%) as illustrated in FIG. 12C(a), the processor 870 may change the windshield with the first transparency to a second transparency (for example, light transmittance of 40%) that is more non-transparent than the first transparency as illustrated in FIG. 12C(b).

Here, the processor 870 may change the transparency of a windshield 810*d* disposed to correspond to a direction in which the unauthenticated user (P2) approaches among a plurality of windshields. Here, the transparency of the windshield 810*d* may be changed to be non-transparent.

On the other hand, though not shown in the drawing, when an authenticated user and an unauthenticated user enter the reference region (A) (approach the vehicle) at the same time, the processor 870 may change the transparency of the windshield 810 to be a lower transparency (for example, light transmittance of 70% or semi-transparent) than that of a case where only the authenticated user approaches (for example, light transmittance of 100%).

In other words, assuming that a first transparency set to the windshield in case where only the authenticated user approaches is 100%, and a second transparency set to the windshield in case where only the unauthenticated user approaches is 40%, the transparency of the windshield may be set to a third transparency between the first transparency and the second transparency.

Even when the authenticated user and the unauthenticated user approach the vehicle at the same time, the processor 870 may set the third transparency to be different according to a number of authenticated users and a number of unauthenticated users. For an example, the third transparency may increase light transmittance as a number of authenticated users increases, and decrease light transmittance as a number of unauthenticated users increases.

Through the foregoing configuration, the present disclosure may provide a vehicle and a vehicle control device provided with a windshield capable of changing the transparency of the windshield to be transparent in case where an authenticated user approaches the vehicle, and changing the transparency of the windshield to be non-transparent in case where an unauthenticated user approaches the vehicle.

On the other hand, the present disclosure may change the transparency of the windshield based on the satisfaction of various conditions as well as a speed of the vehicle and whether or not a user approaches the vehicle.

The processor 870 may adjust the transparency of the windshield 810 based on the surrounding brightness of the vehicle 100 sensed through the sensing unit 860.

For example, as illustrated in FIG. 13A, when the surrounding brightness of the vehicle is brighter than a reference brightness, the processor 870 may set the transparency of the windshield to be a first transparency (for example, light transmittance of 40%).

For another example, as illustrated in FIG. 13B, when the surrounding brightness of the vehicle is darker than a reference brightness, the processor 870 may set the transparency of the windshield to be a second transparency (for example, light transmittance of 100%) that is more transparent than the first transparency.

In addition, the processor 870 may adjust the transparency of the windshield 810 based on the surrounding environment of the vehicle sensed through the sensing unit 860.

For example, the processor 870 may set the transparency of the windshield to be different according to the sensed surrounding environment (for example, humidity, fog, snow, rain, etc.) of the vehicle.

On the other hand, when the vehicle 100 is being stopped (or in a parking state) the processor 870 may control the transparency of at least one of a plurality of windshields 810 to be different from that of the remaining windshields based on whether or not a preset object exists within a predetermined distance from the vehicle 100.

Figure 14:
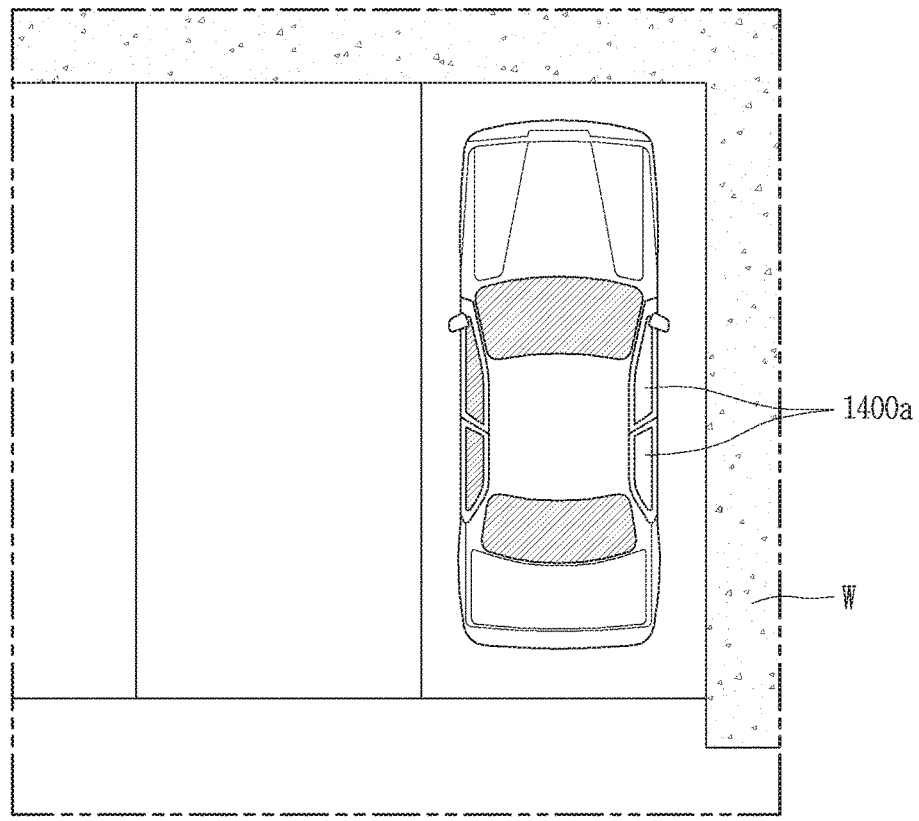

For example, referring to FIG. 14, when the vehicle 100 is being stopped, the processor 870 may sense an object existing within a predetermined distance from the vehicle 100.

The processor 870 may determine whether or not an object sensed through the sensing unit 860 is a preset object.

Here, the preset object may be a previously set object to vary the transparency of the windshield, and have various types. For an example, the preset object may be a wall (W) as illustrated in FIG. 14 or another vehicle though not shown in the drawing. Furthermore, the preset object may include all objects obstructing the user's passage between the vehicle 100 and the object.

When the sensed object is a preset object, and the preset object (W) exists within a predetermined distance from the vehicle 100, the processor 870 may control the transparency of at least one windshield 1400a of a plurality of windshields to be different from that of the remaining windshield.

For an example, the at least one windshield 1400a of the plurality of windshields may be a windshield disposed at a side in which the preset (W) exists.

The processor 870 may set the transparency of the windshield 810a disposed at a side in which the preset object (W) exists among the plurality of windshields to a first transparency (for example, light transmittance of 100%), and set the transparency of the remaining windshields to a second transparency (for example, light transmittance of 40%) different from the first transparency.

Through the foregoing configuration, it may be possible to provide a vehicle control device capable of allowing the transparency of a windshield disposed at a side in which passers-by are rare to be transparent and the transparency of a windshield at a side in which passers-by are frequent to be non-transparent.

On the other hand, the windshield 810 associated with the present disclosure may be formed to allow changing the transparency of a partial region of the entire region.

Figure 15:
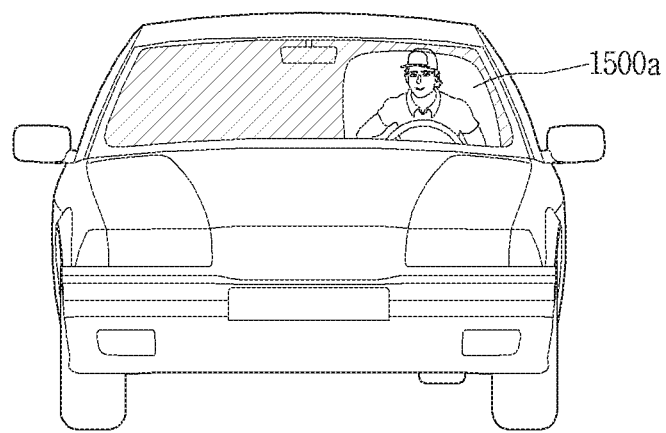

For example, as illustrated in FIG. 15, the windshield 810 of the present disclosure may be set to allow partially changing the transparency on one windshield.

For an example, the processor 870 may vary only the transparency of a partial region 1500a on the entire region of the windshield.

The processor 870 may partially vary the transparency of the windshield based on a position at which a user gets in the vehicle 100, for example.

For example, as illustrated in FIG. 15, the processor 870 may set the transparency of only a partial region 1500a in which a driver gets in the vehicle on a front windshield to a first transparency (for example, light transmittance of 100%), and set the transparency of the remaining portion to a second transparency (for example, light transmittance of 70%).

In addition, the present disclosure may vary the transparency of a partial region of the windshield based on various conditions.

For example, as illustrated in FIG. 16A, when an authenticated user (P1) approaching the vehicle 100 is sensed through the sensing unit 860, the processor 870 may change the transparency of a partial region 1600a of the windshield located in a direction in which the authenticated user (P1) approaches.

On the other hand, as illustrated in FIG. 16B, when an unauthenticated user (P2) approaching the vehicle is sensed, the sensing unit 860 may maintain the transparency of the windshield with no change.

On the other hand, as illustrated in FIG. 16C, when a touch is applied to the windshield, the processor 870 may change the transparency of a predetermined-sized region 1600b around a position to which the touch is applied.

The region 1600b may be a circular shape having a predetermined radius from a position to which the touch is applied or a region including a position to which the touch is applied.

Figure 16:
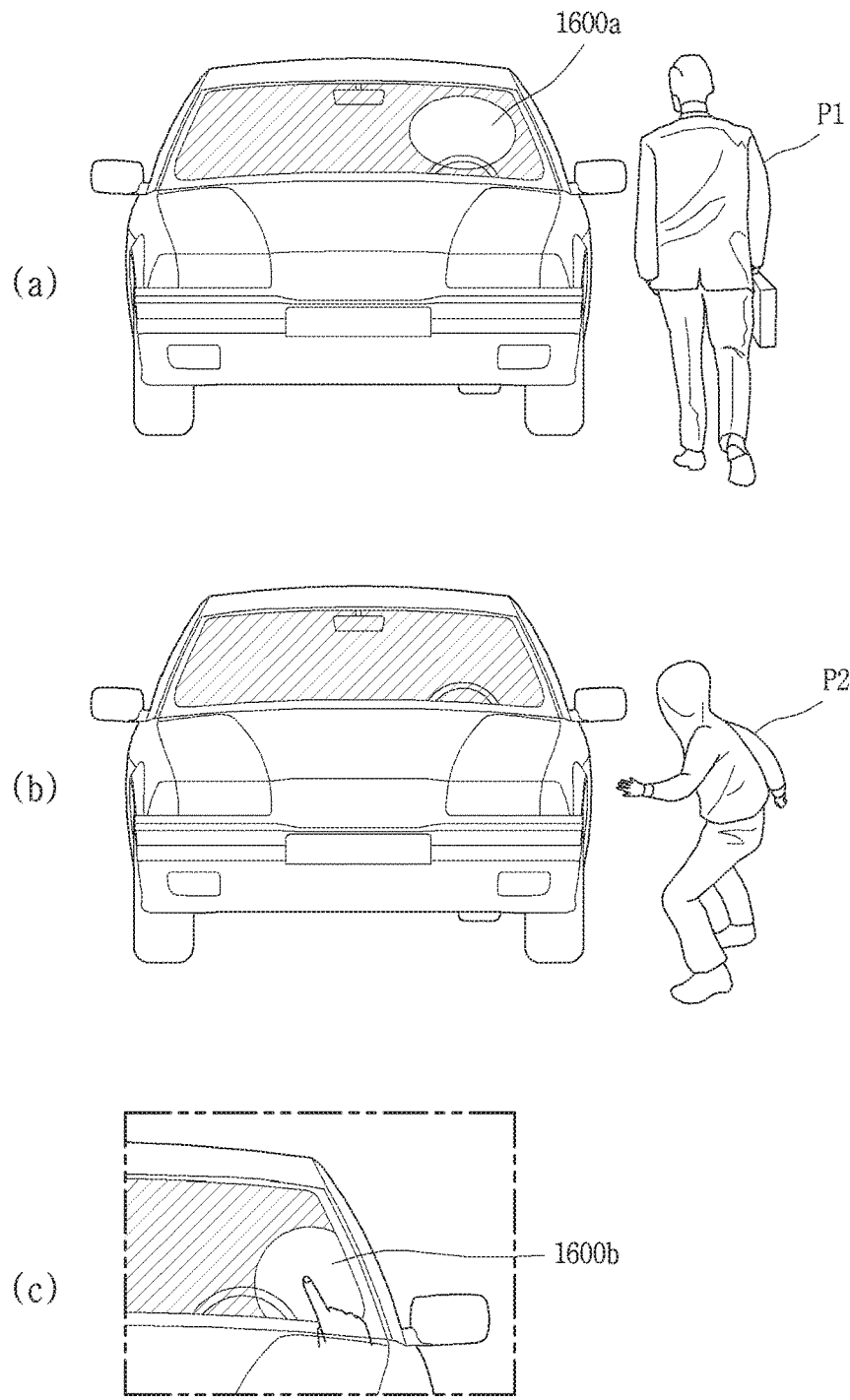

The configuration of FIG. 16 may be carried out when an authenticated user performs an operation. For example, when an authenticated user applies a touch to one position of the windshield 810, the processor 870 may change the transparency of a predetermined-sized region 1600b around the one position.

While the touch is maintained on the windshield, the processor 870 may change the transparency of the region 1600b. The processor 870 may restore the changed transparency on the region 1600b based on the touch being released or restore the changed transparency on the region 1600b after the passage of a predetermined period of time subsequent to releasing the touch.

On the other hand, the processor 870 may perform various functions based on a user gesture applied to the windshield 810.

For example, when a tap gesture is applied to the windshield 810 with a first transparency (for example, light transmittance of 40%) as illustrated in FIG. 17A, the processor 870 may change the first transparency to a second transparency (for example, light transmittance of 100%) as illustrated in FIG. 17B.

Then, when a new tap gesture is applied to the windshield with the second transparency as illustrated in FIG. 17C, the processor 870 may lower or raise the windshield.

For example, when the new tap gesture is applied in a state that the windshield is closed, the processor 870 may lower the windshield. Otherwise, when the new tap gesture is applied in a state that the windshield is open, the processor 870 may raise the windshield.

Furthermore, the processor 870 may lower the windshield when the new tap gesture is applied in a state that the windshield is lowered by a predetermined distance.

On the other hand, the processor 870 may determine whether to change the transparency of the windshield, or lower or raise the windshield according to the type of a gesture applied to the windshield.

For example, when a first type of tap gesture (for example, short tap) is applied to the windshield, the processor 870 may change the transparency.

For another example, when a second type of tap gesture (for example, double tap) is applied to the windshield, the processor 870 may lower the windshield without changing the transparency.

For still another example, when a type of tap gesture (for example, long tap) is applied to the windshield, the processor 870 may raise the windshield without changing the transparency.

The processor 870 may determine whether to adjust the transparency of the windshield, or lower the windshield or raise the windshield based on at least one of a position to which the a gesture is applied and an intensity of the gesture as well as a type of the gesture applied to the windshield.

Furthermore, when the transparency of the windshield is changed based on the tap gesture, the processor 870 may change the transparency of the entire windshield 810 to which the tap gesture is applied or change only the transparency on a predetermined-sized region around a position to which the tap gesture is applied.

Figure 17:
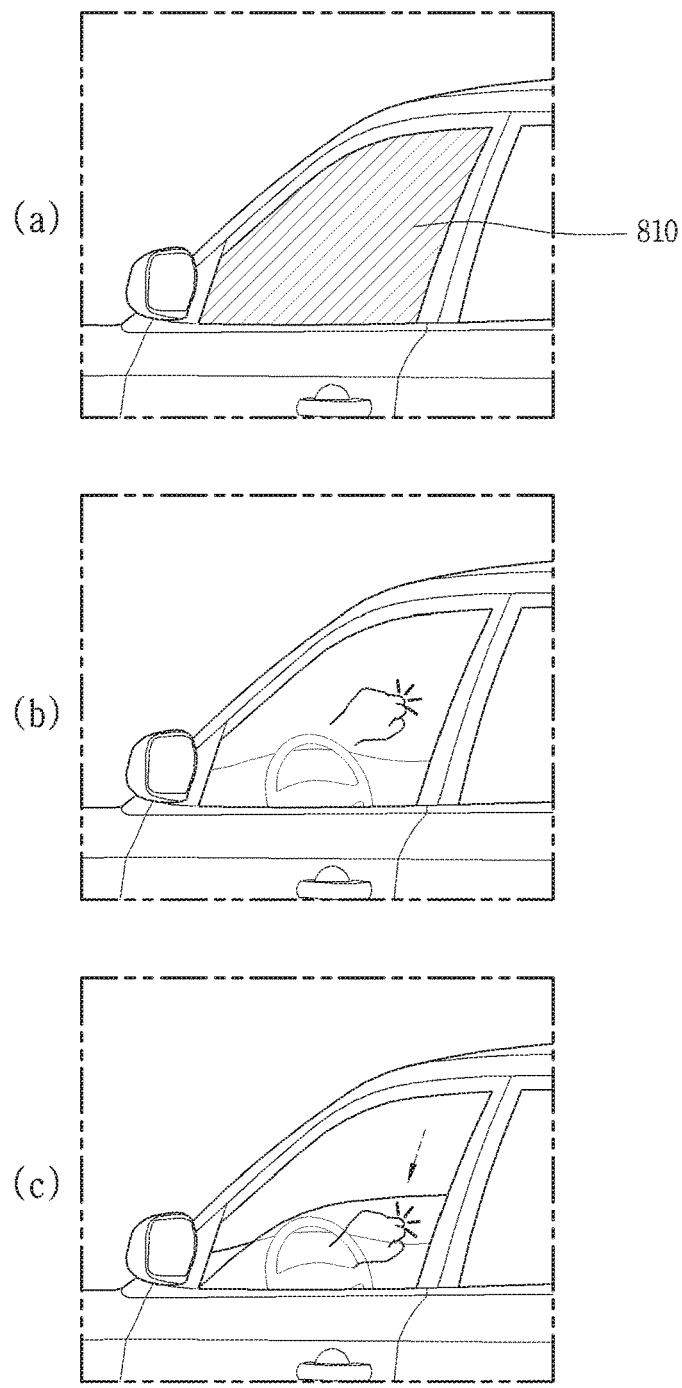

The characteristics of FIG. 17 may be carried out when an operation is performed by an authenticated user. However, the present disclosure may not be necessarily limited to this.

On the other hand, the processor 870 may adjust the transparency of the windshield 810 to be more transparent as a distance between a user (authenticated user (P1)) and the vehicle 100 decreases.

Figure 18:
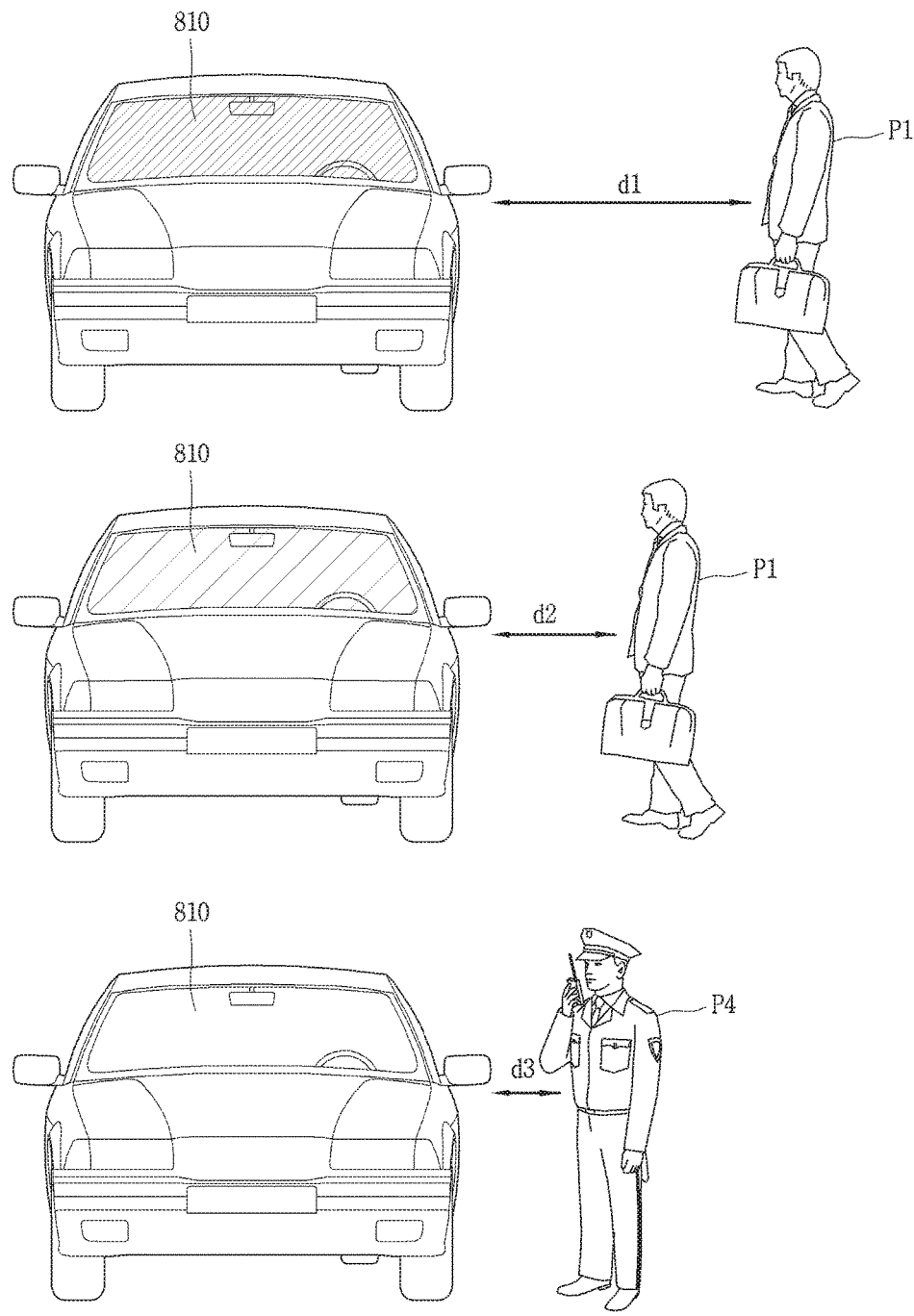

For example, as illustrated in FIG. 18, when a distance between a user (authenticated user (P1)) and the vehicle 100 is d1, the processor 870 may set the windshield 810 to a first transparency (for example, light transmittance of 40%).

On the other hand, when a distance between the user (authenticated user (P1)) and the vehicle 100 is d2 which is shorter than the d1, the processor 870 may set the windshield 810 to a second transparency (for example, light transmittance of 70%) that is more transparent than the first transparency.

The transparency of the windshield 810 may be more transparent as a distance between the user and the vehicle decreases.

On the other hand, when a preset user (P4) (for example, police officer, civil servant, firefighter, etc.) is sensed within a predetermined distance (d3) from the vehicle 100, the processor 870 may change (set) the transparency of the windshield to be transparent (for example, light transmittance of 100%).

Through the foregoing configuration, it may be possible to provide a vehicle control device capable of controlling the transparency of the windshield in various ways based on the satisfaction of a preset condition.

On the other hand, the present disclosure may emit light or display information on the windshield as well as control the transparency of the windshield, thereby providing various user experiences (UXs) to a user.

FIGS. 19, 20, 21, 22, 23 and 24 are conceptual views for explaining various embodiments using a windshield according to an embodiment of the present disclosure.

The windshield associated with the present disclosure may emit light. For example, the windshield 810 may increase display brightness (screen brightness) to emit light to an outside of the vehicle.

For another example, a light source capable of emitting light to an outside of the vehicle may exist on at least part of the windshield.

When information associated with the vehicle sensed through the sensing unit 860 satisfies a preset condition, the processor 870 may control the windshield to allow at least one of a plurality of windshields to emit light.

Figure 19:
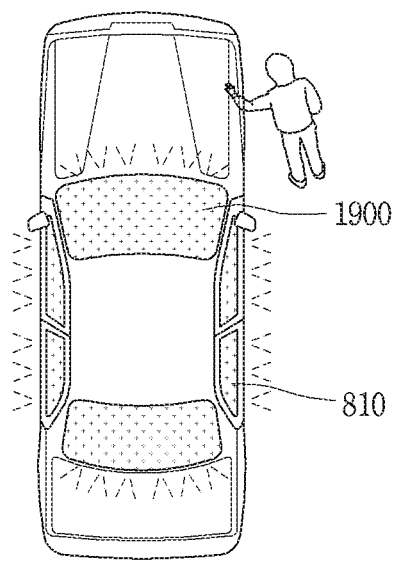
FIGS. 19, 20, 21, 22, 23 and 24 are conceptual views for explaining various embodiments using a windshield according to an embodiment of the present disclosure.

For example, as illustrated in FIG. 19, the processor 870 may allow at least one of the windshields 810 to emit light based on that a shock above a predetermined amount is applied to an outside of the vehicle, or an authenticated user approaches within a predetermined distance from the vehicle, or an authenticated user touches the vehicle 100.

Here, the processor 870 may emit light on all the plurality of windshields, and emit light on only at least one windshield disposed at a side in which an unauthenticated user is located.

Through the foregoing configuration, the present disclosure may provide a user interface capable of sending a warning through the windshield.

Figure 20:
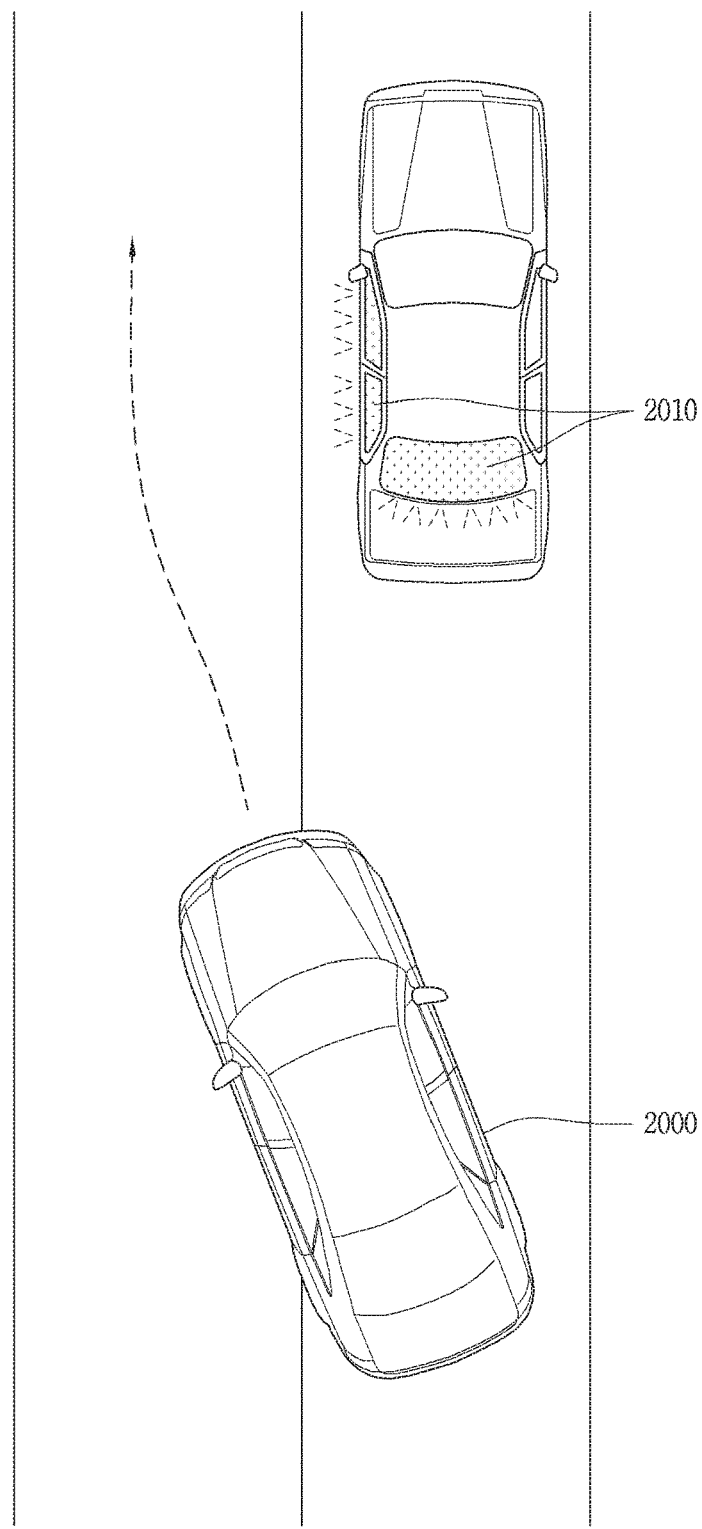

Furthermore, when another vehicle 2000 performing parking or passing ahead is sensed as illustrated in FIG. 20, the processor 870 may emit light on a windshield 2010 disposed in the direction of performing parking or passing ahead.

Through the foregoing configuration, the present disclosure may provide a windshield capable of increasing an amount of light in a space located in the direction of performing parking or passing ahead to prevent an accident due to another vehicle.

On the other hand, when a distance to another vehicle sensed through the sensing unit 860 is less than a reference distance, the processor 870 may emit light on a windshield 2100a disposed at a side of the another vehicle.

Figure 21:
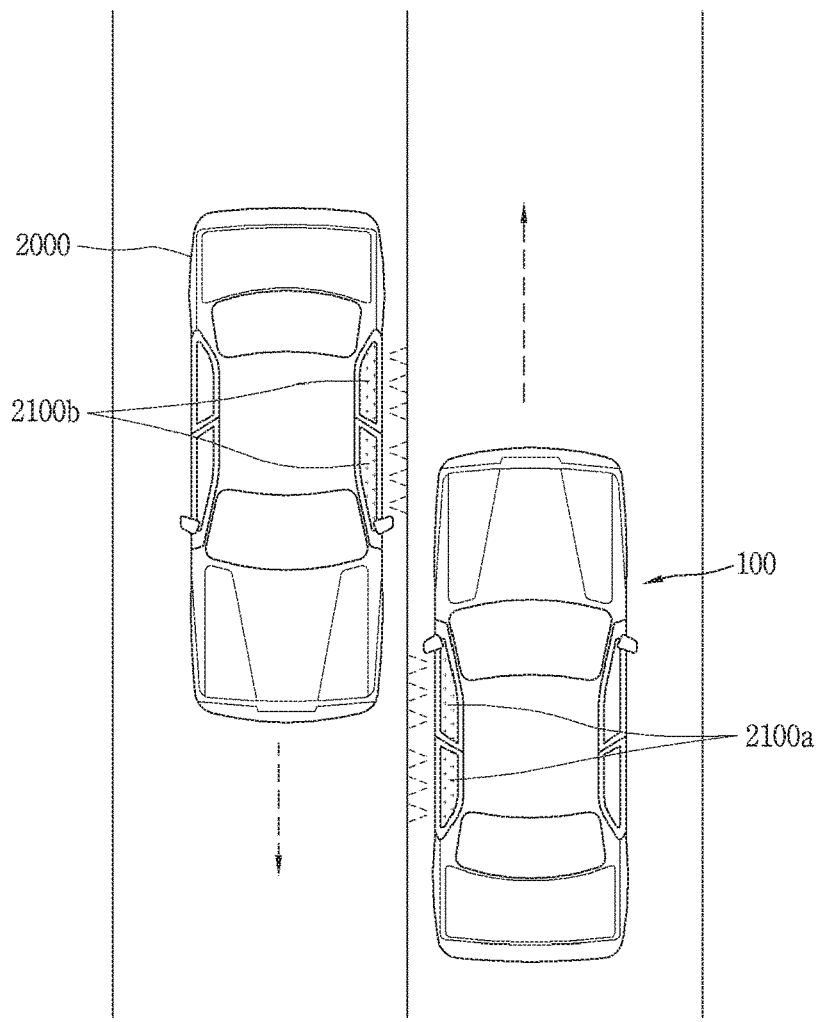

For example, as illustrated in FIG. 21, when a distance to another oncoming vehicle 2000 is less than a reference distance in a state that the vehicle 100 is traveling, the processor 870 may emit light on the windshield 2100a disposed at a side of the another vehicle.

Figure 22:
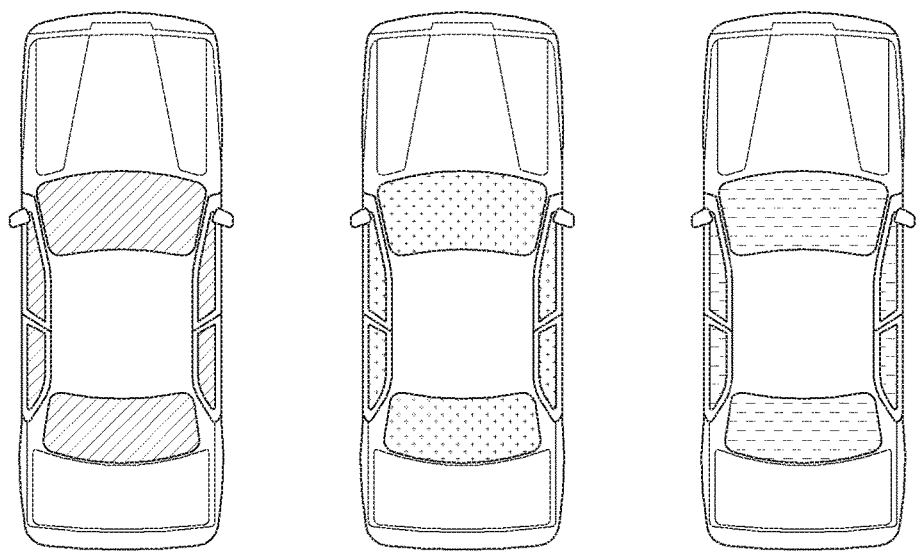

On the other hand, as illustrated in FIG. 22, the processor 870 may emit different colors of light on windshields. The processor 870 may determine the color of light emitted on a windshield based on the user's setting or information associated with a vehicle sensed through the sensing unit.

Through the foregoing configuration, the present disclosure may provide a windshield that can be modified in various ways according to circumstances or a user's preferences.

On the other hand, the present disclosure may display screen information on a windshield.

Here, screen information may include all types of information that can be displayed on a display device. For example, the screen information may include various types of information such as a text, an image, a video, an icon, a graphic object, a page, and the like.

The windshield 810 of the present disclosure is able to display screen information. Furthermore, the processor 870 may display different screen information on the windshield 810 based on information associated with the sensed vehicle.

Figure 23:
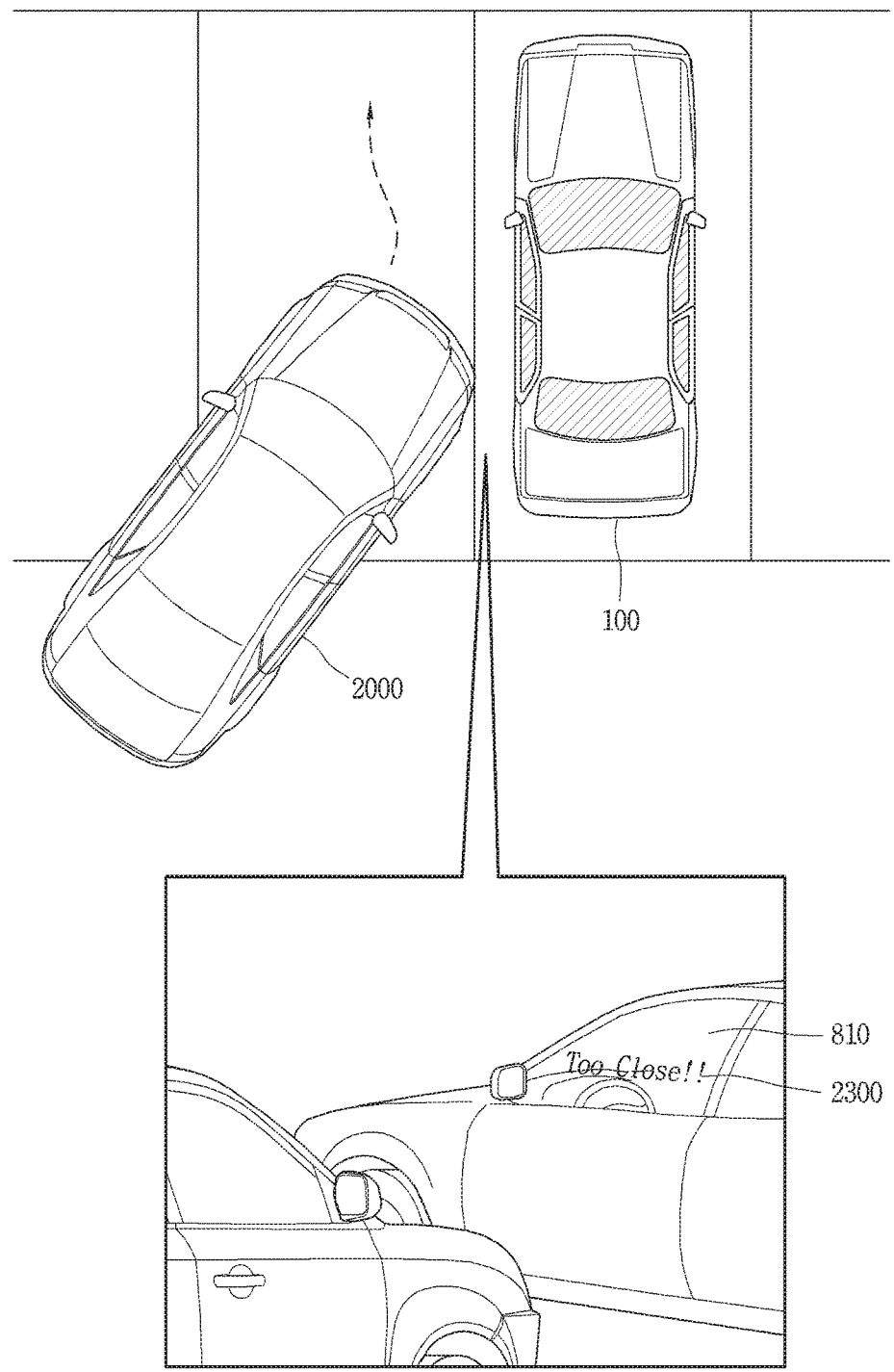

For example, as illustrated in FIG. 23, when another vehicle 200 approaches within a predetermined distance through the sensing unit 860, the processor 870 may display first screen information 2300 (for example, warning message) on the windshield.

Figure 24:
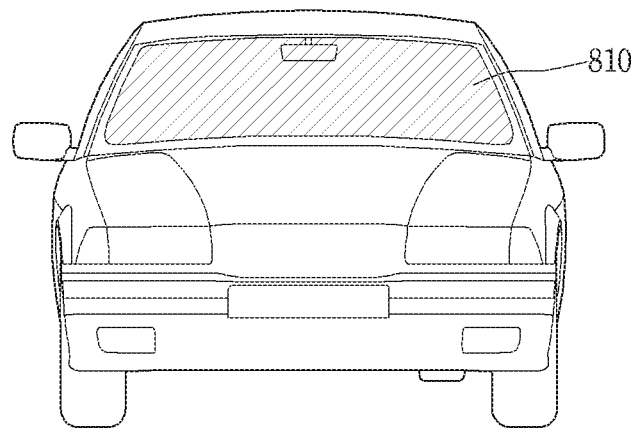
Figure 24:
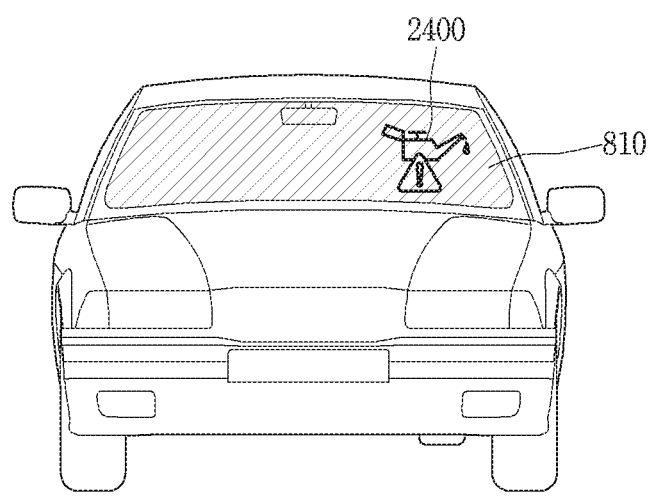

For another example, as illustrated in FIG. 24, when connected to a smart key or an authenticated user's mobile terminal to enable communication, the processor 870 may display second screen information 2400 (for example, an icon indicating the current status of the vehicle) associated with the vehicle on the windshield 810.

Through the foregoing configuration, the present disclosure may provide a user interface capable of displaying various information through the windshield.

According to an embodiment of the present disclosure, there are one or more following effects.

First, the present disclosure may have an effect capable of providing a new vehicle control method capable of varying the transparency of a windshield according to a speed of the vehicle.

Second, the present disclosure may provide a vehicle control device and a vehicle capable of varying the transparency of a windshield according to whether or not a user approaches the surrounding of the vehicle and an approaching user is an authenticated user, thereby having an effect capable of providing convenience to allow the authenticated user to more conveniently see an inside of the vehicle from an outside as well as enhancing security to disallow an unauthenticated user to see an inside thereof.

Third, the present disclosure may irradiate light or display screen information in addition to the transparency of the windshield based on information associated with the vehicle, thereby having an effect capable of effectively notifying a notice or notification information to nearby vehicles.

The effects of the present invention may not be limited to those effects, and other effects which have not been mentioned can be obviously understood by those skilled in the art from the appending claims.

The foregoing vehicle control device 800 may be included in the vehicle 100.

Furthermore, the operation or control method of the foregoing vehicle control device 800 may be analogically applicable to the operation or control method of the vehicle 100 (or controller 170) in the same or similar manner.

For example, the control method of the vehicle 100 (or control method of the vehicle control device 800) may include sensing information associated with a vehicle through a sensing unit, and adjusting the transparency of a windshield provided in the vehicle based on that the sensed information satisfies a preset condition.

The above process may be carried out by the controller 170 provided in the vehicle 100 as well as by the vehicle control device 800.

Furthermore, every function, configuration or control method executed by the vehicle control device 800 may be executed by the controller 170 provided in the vehicle 100. In other words, every control method disclosed herein may be applicable to the control method of the vehicle, and also applicable to the control method of the control device.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A control device, comprising:
    a window formed to be coupled to a vehicle and being configured to change in transparency;
    a sensing unit configured to sense information associated with the vehicle including a driving speed of the vehicle; and
    a processor configured to:
        change the transparency of the window when the information sensed by the sensing unit including the driving speed of the vehicle satisfies a defined condition.

2. The control device of claim 1, wherein the processor is further configured to:
    change the transparency of the window when the driving speed of the vehicle meets or exceeds a threshold speed.

3. The control device of claim 1, wherein the processor is further configured to:
    change the transparency to a first transparency when the driving speed of the vehicle exceeds a first value; and change the transparency to a second transparency different from the first transparency when the driving speed of the vehicle exceeds a second value different from the first value.

4. The control device of claim 1, wherein the processor is further configured to:
sense a person approaching the vehicle via information sensed by the sensing unit; and
change the transparency of the window when the sensed person enters a reference region relative to the vehicle.

5. The control device of claim 1, wherein the processor is further configured to;
sense a person approaching the vehicle via information sensed by the sensing unit; and
change the transparency of the window when the sensed person enters a reference region relative to the vehicle and the sensed person is an authenticated person.

6. The control device of claim 1, wherein the processor is further configured to:
sense a person approaching the vehicle via information sensed by the sensing unit; and
change the transparency of the window from a first transparency to a second transparency different from the first transparency, when the sensed person enters a reference region relative to the vehicle.

7. The control device of claim 1, further comprising:
a plurality of windows, each being configured to change in transparency and formed to be coupled to the vehicle; and wherein the processor is further configured to:
sense a person approaching the vehicle via information sensed by the sensing unit; and
change the transparency of at least one window among the plurality of windows based on a direction in which the sensed person approaches the vehicle.

8. The control device of claim 7, wherein the processor is further configured to:
select the at least one window from among the plurality of windows according to the at least one window being located in the direction in which the sensed person approaches the vehicle.

9. The control device of claim 1, wherein the processor is further configured to:
sense a person approaching the vehicle via information sensed by the sensing unit; and
change the transparency of the window when the sensed person enters a reference region relative to the vehicle and the sensed person is not an authenticated person and an authenticated person is located within the vehicle.

10. The control device of claim 1, wherein the processor is further configured to:
sense a person approaching the vehicle via information sensed by the sensing unit; and
change the transparency of the window from a first transparency to a second transparency that is less transparent than the first transparency when the sensed person enters a reference region relative to the vehicle and the sensed person is an authenticated person.

11. The control device of claim 1, wherein the processor is further configured to:
change the transparency of the window based on changes in light brightness outside of the vehicle as sensed through the sensing unit.

12. The control device of claim 1, further comprising:
a plurality of windows, each being configured to change in transparency and formed to be coupled to the vehicle; and wherein the processor is further configured to:
sense whether an object is within a predetermined distance from the vehicle while the vehicle is stopped; and
cause the transparency of at least one window of the plurality of windows to be different from the transparency of remaining windows among the plurality of windows, based on whether the object is within the predetermined distance.

13. The control device of claim 1, wherein the window is a windshield and is formed to allow changing of the transparency of only a partial region of windshield.

14. The control device of claim 13, wherein the processor is further configured to:
change the transparency of a predetermined-sized region of the window when a touch is applied to the window, wherein location of the predetermined-sized region on the window is based on location at which the touch is applied to the window.

15. The control device of claim 1, wherein the processor is further configured to;
change the transparency of the window from a first transparency to a second transparency when a first tap gesture is applied to the window; and
raise a lowered window, or lower a raised window, when a second tap gesture is applied to the window.

16. The control device of claim 1, wherein the processor is further configured to:
sense a person that is located within a reference region relative to the vehicle via information sensed by the sensing unit; and
change the transparency of the window to be increasingly more transparent as distance between the person and the vehicle decreases.

17. The control device of claim 1, further comprising:
a plurality of windows, each being configured to change in transparency and formed to be coupled to the vehicle; and wherein the processor is further configured to:
cause at least one of the plurality of windows to emit light when information sensed by the sensing unit satisfies a further defined condition.

18. The control device of claim 1, wherein the processor is further configured to:
cause the window to display screen information based on information sensed by the sensing unit.

19. A vehicle, comprising:
a window being configured to change in transparency;
a sensing unit configured to sense information associated with the vehicle including a driving speed of the vehicle; and
a processor configured to:
change the transparency of the window when the information sensed by the sensing unit including the driving speed of the vehicle satisfies a defined condition.

20. A method, comprising:
sensing, via a sensing unit, information associated with a vehicle including a driving speed of the vehicle; and
changing transparency of a window of the vehicle when the information sensed by the sensing unit including the driving speed of the vehicle satisfies a defined condition.

* * * * *